(No Model.)

J. BOEKEL.
LARYNGOSCOPE.

No. 343,696. Patented June 15, 1886.

WITNESSES:
A. P. Grant,
W. F. Fischer

INVENTOR
Julius Boekel,
BY John A. Diedersheim
ATTORNEY.

UNITED STATES PATENT OFFICE.

JULIUS BOEKEL, OF PHILADELPHIA, PENNSYLVANIA.

LARYNGOSCOPE.

SPECIFICATION forming part of Letters Patent No. 343,696, dated June 15, 1886.

Application filed March 23, 1886. Serial No. 196,249. (No model.)

*To all whom it may concern:*

Be it known that I, JULIUS BOEKEL, a citizen of the United States, residing in the city and county of Philadelphia, State of Pennsylvania, have invented a new and useful Improvement in Laryngoscopes, which improvement is fully set forth in the following specification and accompanying drawings, in which—

Figure 1:
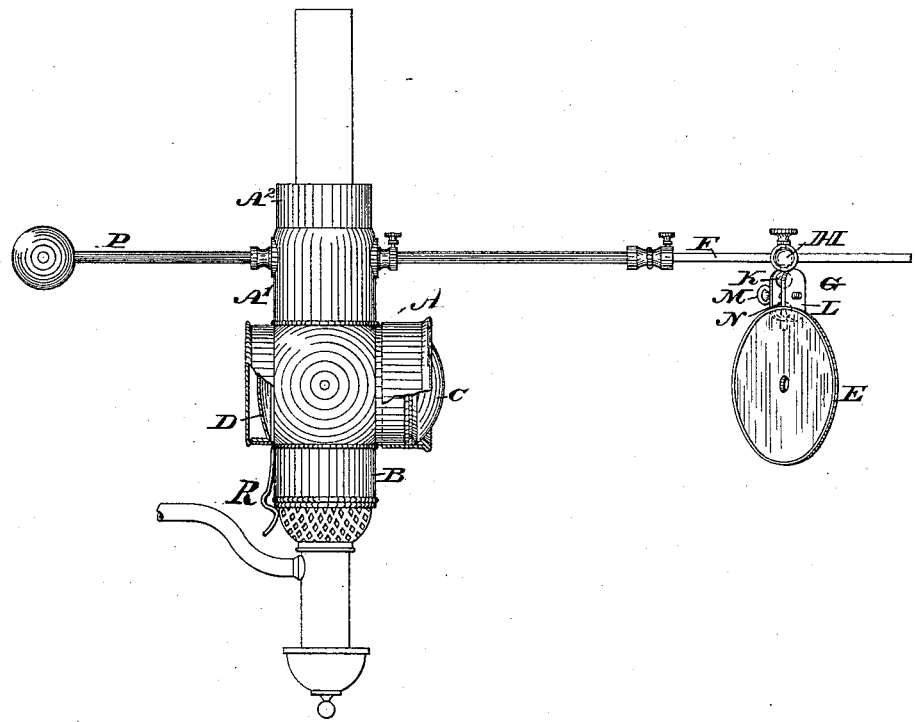
Figure 2:
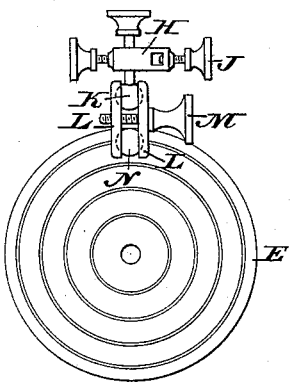

Figure 1 represents a partial side elevation and partial vertical section of a laryngoscope embodying my invention. Fig. 2 represents a rear view of the mirror and connected bracket.

Similar letters of reference indicate corresponding parts in the two figures.

My invention consists in attaching the mirror to the laryngoscope itself, avoiding such attachment to the head of the operator, or the employment of a separate stand.

It further consists of means for controlling the light and of other details, as will be hereinafter fully set forth.

Referring to the drawings, A represents a spherical body having a depending cylinder or tube, B, which is adapted to be placed over a lamp, gas-burner, or other illuminating device, the flame or light thereof being within said body, the inner face of the body being of a reflecting nature. Attached to what may be termed the "front" of the body is a lens, C, and within the body at the back thereof and opposite to the lens is a reflector, D, whereby the light is concentrated and directed through the lens to the mirror E of the laryngoscope, which, as will be seen, is connected with the laryngoscope by means of a rod, F, which is attached to a sleeve, A', on the upper extension, A², of the body A, and projects horizontally therefrom, said mirror having a bracket, G, whose upper portion, H, is slipped on the rod F, and held thereon by a screw, J, whereby the mirror may be moved nearer to or farther from the lens, and located in the focal line.

The bracket G consists of the portion H, which is of the form of a bar with an opening to receive the rod F, the screw being fitted to the side of the bar so as to tighten against the rod. Depending from the bar is a ball, K, which is clamped between socket-plates L, by means of a screw, M. Between said plates is also clamped a ball, N, which is secured to the rim or back of the mirror, by which construction double ball-and-socket joints are formed in the bracket, whereby the mirror may be set at various angles. The vertical adjustment of the mirror is accomplished by means of the sleeve A', and thus, by the different adjustments named, the reflected light may be properly directed to the object to be examined.

In order to counterbalance the weight of the mirror and connected parts, I employ a weighted rod, P, which is secured to the part A', on the side opposite to the rod F. The spring R is employed to more firmly secure the device to the lamp.

Having thus described my invention, what I claim as new, and desire to secure by Letters Patent, is—

1. In a laryngoscope, the body A, with upper extension, A², in combination with sleeve A', vertically adjustable on said extension, and carrying the mirror-supporting arm and counter-balance P, substantially as described.

2. In a laryngoscope, the spherical body A, with reflector D and lens C, in combination with depending tube B, the sleeve A', the balancing-weight P, and mirror E, with means, substantially as described, for adjustably attaching said mirror to said sleeve, substantially as described.

3. A laryngoscope formed of the body A, with reflector and lens, and means, substantially as described, for securing said body to a lamp, a mirror having the ball N secured thereto, the socket-plates L, with screw M, the bar K, having an opening and a depending ball, screw J, and rod F, all arranged and operating substantially as described.

JULIUS BOEKEL.

Witnesses:
JOHN A. WIEDERSHEIM,
A. P. GRANT.